March 28, 1950     H. M. NORMAN     2,502,338
MULTIPLE SPEED ELECTRIC MOTOR
Filed June 2, 1947
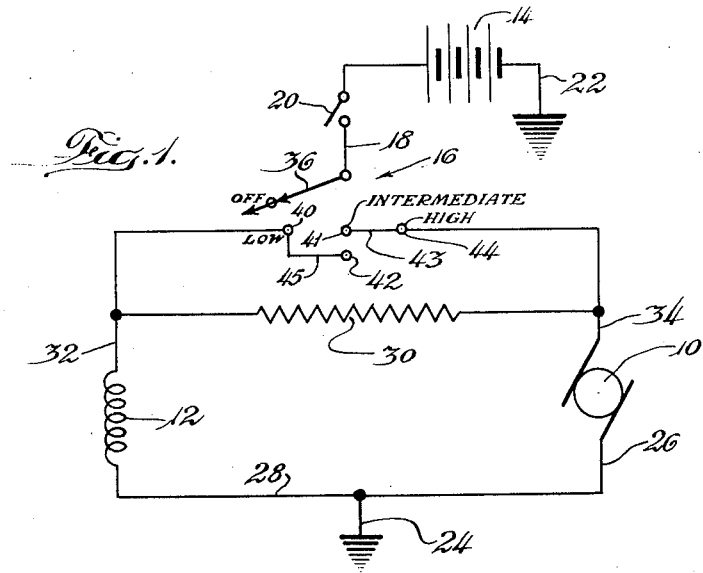
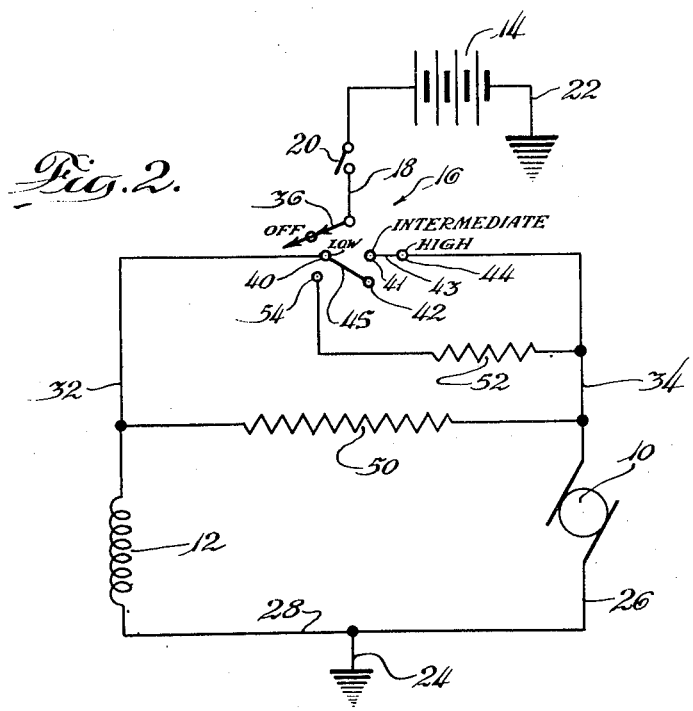
INVENTOR.
Horace M. Norman Patented Mar. 28, 1950

2,502,338

UNITED STATES PATENT OFFICE 2,502,338

MULTIPLE-SPEED ELECTRIC MOTOR

Horace M. Norman, Skokie, Ill., assignor to Stewart-Warner Corporation, Chicago, Ill., a corporation of Virginia Application June 2, 1947, Serial No. 751,665

3 Claims. (Cl. 318—405)

1

The present invention relates to electric motors and has for its primary object the provision of a new and improved multiple speed electric motor.

A further object of the present invention is to provide a simple, effective, low cost multiple speed electric motor having good starting torque characteristics at all speeds.

A further object of the present invention is to provide a new and improved multiple speed electric motor of such a character that such motors can be built readily, and existing motors can be converted readily to provide the desired variable speeds.

Other objects and advantages of the present invention will become apparent from the ensuing description of two embodiments thereof, in the course of which reference is had to the accompanying drawing, in which Figs. 1 and 2 are schematic circuit diagrams of electric motors constructed in accordance with the invention.

Referring first to Fig. 1, the electric motor is illustrated as comprising an armature 10 and a shunt field 12. The connection of these to the power supply, which may be a battery 14, is controlled by speed selector switch means 16 controlling the connections of the armature and field to the battery through a power supply conductor 18 having an on-off switch 20 interposed therein.

The present invention is particularly adapted for installations where low cost is vital, as in electric windshield wipers. In an installation of this character the switch 20 is the ignition switch, and the battery 14 is the usual automobile storage battery, one terminal of which is grounded through conductor 22, and the other connected to conductor 18 and switch 20. The circuit to the battery from the motor is completed through a ground conductor 24 connected by conductor 26 to one terminal of the armature, and by conductor 28 to the corresponding terminal of the field.

The present invention, as already indicated, provides a simple, effective and low cost means for operating the motor at a plurality of speeds. This means includes resistance means, which is illustrated as being a single resistor 30 permanently connected to corresponding terminals of the field and armature by conductors 32 and 34, respectively. The connections of the resistor, field and armature to the selector switch means 16 is such that for one speed the resistor 30 is connected in series with the field, for another speed the resistor is connected in series with the armature, and for a third speed the resistor is effectively not in circuit with either.

The selector switch means may be a simple plural position switch comprising a movable switch blade 36 illustrated as being in an off position but operable into three other positions for the high, intermediate, and low speeds.

In the low speed position the switch blade 36 engages contact 40, which is connected by the conductor 32 to the junction of field 12 and resistor 30. In this position the field is connected directly across the battery while the resistor 30 is connected in series with the armature, thereby reducing the armature voltage.

In the intermediate speed position the switch blade engages contacts 41 and 42 which are connected by conductors 43 and 45 to conductors 32 and 34 and thus directly to terminals of the field and armature. In this position full battery voltage is applied to the field and armature and the resistor 30 is effectively not in circuit.

In the high speed position the switch blade 36 is in engagement with contact 44 so that the full battery voltage is applied across the armature and a reduced voltage is applied to the field by virtue of the resistor 30 being inserted in series with the latter.

The resistor 30 can be placed either inside or outside of the motor. Ordinarily it will be placed inside of the motor. Its value in ohms can also be made relatively small because the desired speed differential, at least between the high and low speeds, is obtained by virtue of using the resistance in series selectively with both the field and armature. Consequently, to obtain the high speed, the voltage applied to the field does not have to be reduced as much as in conventional arrangements where the resistor is connected only in series with the field. The arrangement also produces a better high speed starting torque than is possible with conventional arrangements so that good torques are provided for the various speeds.

It is believed that the operation of the motor will be apparent from the foregoing but it will be reviewed briefly. The motor is placed into operation by closing the switch 20 and operating the movable switch blade 36 into a desired position. In the high speed position the blade engages contact 44, with the result that the armature is operated at full voltage and the field at reduced voltage, thereby to provide the high speed operation. In the intermediate speed position the switch blade engages contacts 41 and 42 with the result that both the armature and field are operated at full voltage. In the low speed position the blade engages contact 40 with the result that the field is operated at full voltage and the armature at reduced voltage.

It is possible to use a single resistor in motors designed to embody the present invention, and it is also possible to use a single resistor in the conversion of motors which have already been built if the armature and field resistances and the saturation curve of the magnetic circuit are such as to enable the single resistor to be used. Where the characteristics are not such, the arrangement of Fig. 2 can be used.

Referring now to Fig. 2, it may be noted that the arrangement is like that illustrated in Fig. 1 except that two resistors 50 and 52 are used. Resistor 50 is connected in the same manner as resistor 30, while resistor 52 is connected to resistor 50, preferably by connection thereof to conductor 34. The other terminal of resistor 52 is connected to a switch contact 54 adapted to be engaged by the movable switch blade 36 simultaneously with the contact connected to one terminal of the resistor 50, preferably the contact 40.

In essence, the difference between the two arrangements is that a resistance means of one value is inserted in series with the field, and a different value resistance means is inserted in series with the armature. The values of these resistors can be chosen so that the motor will have the desired operating characteristics. Consequently, this embodiment is particularly susceptible for use in converting existing motors into multiple speed motors.

While the present invention has been described in connection with the specific details of two embodiments thereof, it should be understood that these details are not intended to be limitative of the invention except in so far as set forth in the accompanying claims.

Having thus described my invention, what I claim as new and desire to secure by Letters Patent is:

1. A multiple speed electric motor including an armature, a field connected in shunt with the armature, a resistor connected between one field terminal and one armature terminal, the remaining terminals being connected together, a second resistor having one of its two terminals connected to the junction of said first mentioned resistor and the armature, and a plural position speed selector switch adapted selectively to connect the junction of both said resistors and armature or the junction of said first resistor and field and the second terminal of said second resistor to a power supply conductor, whereby in one position of said switch the armature is directly connected to said conductor and the field is connected to it through said first resistor and in another position the field is directly connected to said conductor and the armature is connected to it through the resistors connected in parallel.

2. A multiple speed electric motor including an armature, a field connected in shunt with the armature, a resistor connected between one field terminal and one armature terminal, the remaining terminals being connected together, a second resistor having one terminal connected to the junction of said first mentioned resistor and the armature and a second terminal, and speed selector switch means adapted selectively to connect the junction of both said resistors and armature, the junction of said first resistor and field and the second terminal of said second resistor, or the junctions of said first resistor with both the field and armature to a power supply conductor, whereby in one condition of said switch means the armature is directly connected to said conductor and the field is connected to it through said first resistor, in another condition the field is directly connected to said conductor and the armature is connected to it through the resistors connected in parallel, and in a further condition both the field and armature are directly connected to said conductor.

3. A multiple speed electric motor including an armature, a field connected in shunt with the armature, first resistance means connected between one field terminal and one armature terminal the other field and armature terminals being connected together, other resistance means having one of its terminals connected to said first resistance means, and speed selector switch means adapted selectively to connect a power supply conductor to either the other terminal of said second resistance and first mentioned field terminal, or to the first mentioned field and armature terminals, or to the first mentioned armature terminal.

HORACE M. NORMAN.

REFERENCES CITED

The following references are of record in the file of this patent:

UNITED STATES PATENTS

| Number | Name | Date |
|--------|------|------|
| 865,811 | Powell | Sept. 10, 1907 |
| 1,282,836 | Horton | Oct. 29, 1918 |

FOREIGN PATENTS

| Number | Country | Date |
|--------|---------|------|
| 17,137 | Great Britain | of 1908 |